United States Patent
Zwemer et al.

(10) Patent No.: US 7,369,253 B2
(45) Date of Patent: May 6, 2008

(54) SYSTEMS AND METHODS FOR MEASURING SAMPLE SURFACE FLATNESS OF CONTINUOUSLY MOVING SAMPLES

(75) Inventors: Dirk Adrian Zwemer, Atlanta, GA (US); Jiahui Pan, Atlanta, GA (US); Gregory James Petriccione, Marietta, GA (US); Sean Patrick McCarron, Alpharetta, GA (US)

(73) Assignee: AkroMetrix, LLC, Atlanta, GA (US)

( * ) Notice: Subject to any disclaimer, the term of this patent is extended or adjusted under 35 U.S.C. 154(b) by 266 days.

(21) Appl. No.: 11/241,318

(22) Filed: Sep. 30, 2005

(65) Prior Publication Data

US 2006/0077400 A1 Apr. 13, 2006

Related U.S. Application Data

(60) Provisional application No. 60/617,843, filed on Oct. 13, 2004.

(51) Int. Cl.
 *G01B 9/02* (2006.01)
 *G01B 11/30* (2006.01)
 *G06K 9/00* (2006.01)
 *G01D 5/36* (2006.01)

(52) U.S. Cl. ............. 356/521; 356/600; 382/149; 250/237 G

(58) Field of Classification Search ............. 356/600, 356/429–430, 512–515, 516, 521; 250/237 G; 382/149
See application file for complete search history.

(56) References Cited

U.S. PATENT DOCUMENTS

| | | |
|---|---|---|
| 4,025,195 A | 5/1977 | Ebersole et al. |
| 4,714,348 A | 12/1987 | MaKosch |
| 4,794,550 A | 12/1988 | Greivenkamp, Jr. |
| 5,085,502 A | 2/1992 | Womack et al. |
| 5,202,749 A | 4/1993 | Pfister |
| 5,307,152 A | 4/1994 | Boehnlein et al. |
| 5,309,222 A | 5/1994 | Kamei et al. |

(Continued)

FOREIGN PATENT DOCUMENTS

JP 01-13406 1/1989

OTHER PUBLICATIONS

Brownell et al., "Automated Fringe Analysis For Moiré Interferometry," 1990, SPIE Code, 1554, pp. 162-173.

(Continued)

*Primary Examiner*—Patrick Connolly
(74) *Attorney, Agent, or Firm*—King & Spalding LLP

(57) ABSTRACT

Measurement of sample surface flatness of a continuously moving sample. A conveyor continuously conveys a sample beneath a grating disposed at a non-zero angle with respect to the plane of conveyance. The relative distance between the sample and the angled grating changes with the horizontal translation of the sample. A camera disposed above the sample and the grating captures, at constant time intervals, a sequence of images, each image comprising a shadow moiré fringe pattern that is indicative of the sample's surface flatness. The continuous change in relative distance between the sample and the grating introduces a known or unknown phase step between the shadow moiré fringe patterns of each successive image. A computer associated with the camera processes the images to determine phase values of pixels at, and the relative height of the sample surface at, selected pixel locations of the sample.

35 Claims, 10 Drawing Sheets

U.S. PATENT DOCUMENTS

| | | | |
|---|---|---|---|
| 5,311,286 A | | 5/1994 | Pike |
| 5,319,445 A | | 6/1994 | Fitts |
| 5,345,514 A | | 9/1994 | Mahdavieh et al. |
| 5,383,025 A | | 1/1995 | Forrest |
| 5,406,342 A | | 4/1995 | Jongsma |
| 5,581,632 A | | 12/1996 | Koljonen et al. |
| 5,583,632 A | | 12/1996 | Haga |
| 5,601,364 A | | 2/1997 | Ume |
| 5,835,218 A | * | 11/1998 | Harding ............... 356/521 |
| 5,835,223 A | * | 11/1998 | Zwemer et al. ........... 356/600 |
| 5,969,819 A | * | 10/1999 | Wang ............... 356/600 |
| 6,246,067 B1 | * | 6/2001 | Tullis ............... 250/559.3 |
| 6,817,528 B2 | * | 11/2004 | Chen ............... 235/462.13 |
| 7,061,628 B2 | * | 6/2006 | Franke et al. ........... 356/604 |
| 2003/0007159 A1 | * | 1/2003 | Franke et al. ........... 356/604 |
| 2006/0077400 A1 | * | 4/2006 | Zwemer et al. ........... 356/605 |
| 2006/0082787 A1 | * | 4/2006 | Franke et al. ........... 356/604 |
| 2006/0103854 A1 | * | 5/2006 | Franke et al. ........... 356/603 |
| 2007/0086020 A1 | * | 4/2007 | Han et al. ............. 356/605 |

OTHER PUBLICATIONS

Chang et al., "High Precision Deformation Measurement By Digital Phase Shifting Holographic Interferometry," 1985, Applied Optics, 24(22), pp. 3780-3783.

Chang et al., "Phase-Measuring Profilometry Using Sinusoidal Grating," 1993, Experimental Mechanics, pp. 117-122.

Foran et al., "Measurement/Prediction of Board Warpage," 1995, Circuits Assembly, pp. 1-4.

Sciammarella et al., "A Computer Based Method for Fringe Pattern Analysis," 1984, Conference on Computer-Aided Testing and Model Analysis, pp. 61-69.

Sullivan, "Phase-Stepped Functional Moire," 1991, Experimental Mechanics, pp. 373-381.

Tsang et al., "Real Time Measurement of Printed Wiring Board Flatness in a Simulated Manufacturing Environment," Georgia Institute of Technology, School of Mechanical Engineering, pp. 1-11, 1996.

Wang et al., "Measurement of Thermal Deformation of BGA Using Phase-Shifting Shadow Moire," 1997, Society of Experimental Mechanics, pp. 1-2.

Zwemer, Letter to Rich Neuman, 1995, pp. 1-2.

Pan et al., "Flatness Measurement of a Moving Object Using Shadow Moire Technique with Phase Shifting," 2005, SEM Annual Conference, pp. 1-6.

Pan et al., "Flatness Measurement of a Moving Object Using Shadow Moire Technique with Phase Shifting," 2005, SEM Annual Conference, PowerPoint, pp. 1-19.

Han et al., "Geometric Moire Methods with Enhanced Sensitivity by Optical/Digital Fringe Multiplication," 1993, Experimental Mechanics, pp. 195-197.

* cited by examiner

PRIOR ART

SYSTEMS AND METHODS FOR MEASURING SAMPLE SURFACE FLATNESS OF CONTINUOUSLY MOVING SAMPLES

RELATED PATENT APPLICATION

The present patent application claims priority under 35 U.S.C. § 119 to U.S. Provisional Patent Application No. 60/617,843, entitled "Machine for Measuring Sample Surface Flatness of Continuously Moving Parts or Sheet Material," filed Oct. 13, 2004, which is hereby incorporated by reference.

FIELD OF THE INVENTION

The invention relates generally to measuring sample surface flatness of objects, and more particularly to quantifying the surface flatness of continuously moving samples using a shadow moiré image processing technique and phase-sensitive analysis.

BACKGROUND OF THE INVENTION

Surface flatness is a common measurement specification over a wide range of manufacturing industries. Flatness critically affects, for example, the reliability and assembly yield of electronic products, the cosmetic appearance and handling characteristics of paper products, and the mechanical fit and functionality of fabricated metal components. Non-flatness, or warpage, is a frequent problem in manufacturing, due to inadequacies in design, materials, and/or processing of components. The ability to distinguish and reject components whose non-flatness exceeds user specifications is valuable on the production line because it allows the manufacturer or user to avoid problems in later manufacturing steps, maintain product quality, and recognize processing problems early.

Shadow moiré measurement techniques have previously been applied to measure surface flatness in printed circuit boards and other electronic packaging components. Shadow moiré is an optical method for measuring relative vertical displacement of (semi-) continuous opaque surfaces. It is a full-field technique, i.e., it simultaneously acquires optical data across an entire sample. Shadow moiré is based on the geometric interference of a shadow grating projected on the sample surface and a real grating on a flat reference surface. For example, when a printed circuit board is viewed through a grating and a shadow of the grating is cast upon the surface of the printed circuit board, the shadow and the grating can interact to create a shadow moiré fringe pattern that is indicative of the warpage of the surface of the printed circuit board.

FIG. 1 illustrates an exemplary system 100 for measuring surface flatness of a sample 105 utilizing traditional shadow moiré measurement techniques. The system 100 comprises a light source 110, a grating 120 suspended above a sample 105, and a camera 115, e.g., a charge coupled device (CCD) camera, associated with a computer 125. The grating 120 is of the Ronchi type, comprising a generally planar plate of transparent material that includes multiple parallel and evenly spaced opaque lines extending across the surface of the plate. Typically, the grating 120 has a periodicity of 50 to 500 lines per inch. The center-to-center distance between the lines, the pitch ("P") of the grating, is constant. The grating 120 is generally parallel to the sample 105. The light source 110 is a continuous or pulsed white light source of the line source type, wherein the line is parallel to the lines of the grating 120 surface.

FIG. 2 illustrates an exemplary instance 200 of the shadow moiré technique. Referring to FIGS. 1 and 2, the light source 110 illuminates the grating 120 and the sample 105 at an oblique angle of incidence. The light 111 projects a shadow 215 of the grating 120 (i.e., a shadow of the opaque lines of the grating 120, referred to herein as a "shadow grating" 215) onto the sample 105. The camera 115 captures one or more images 112 of the grating 120, the sample 105, and the shadow grating 215. The camera typically observes the image(s) 112 at an angle of 0° (normal). A stationary support structure (not shown) holds the sample 105 in place during the period in which the camera 115 captures the image(s) 112.

The overlap of the shadow grating 215 and the real grating 120 in the image(s) 112 is a periodic function of the distance between them. When the surface of the sample 105 is curved or warped, a series of dark and light fringes (moiré fringes) are produced as a result of the geometric interference pattern created between the reference grating 120 and shadow grating 215. The moiré fringes are indicative of the warpage of the sample 105. In other words, the moiré fringes correspond to contour lines of the topography of the upper surface of the sample 105. The computer 125 associated with the camera 115 comprises software that can quantify the warpage from the shadow moiré fringe pattern.

FIG. 3 is a schematic view of an exemplary shadow moiré fringe pattern 300 that could be received by the camera 115 (FIG. 1) in the above-described circumstances. The shadow moiré fringe pattern 300 comprises a series of dark and light fringes 305. In general, the greater the warpage of the sample 105, the larger the number of fringes 305. Each successive fringe represents a height change of the sample surface of W, the height per fringe. W can be calculated with the following equation:

$$W = \frac{P}{\tan a + \tan b},$$

where P is the pitch of the grating, a is the angle of incidence, and b is the angle of observation.

FIG. 4, comprising FIGS. 4a and 4b, illustrates a system 400 for measuring surface flatness of a sample 105 using the phase stepping analytical method. Phase stepping is an analytical method that has been used to improve the resolution of the shadow moiré technique and automatically identify the direction of height change from fringe to fringe across the sample 105. Without phase stepping or some equivalent technique, shadow moiré is of limited usefulness for routine automated analysis.

In conventional phase stepping, a conveyor 145 transports a sample 105 beneath a grating 120 and camera 115 (FIG. 1). Once the sample 105 is beneath the grating 120 and camera 115, the conveyor 145 stops moving the sample 105, and the camera 115 captures three or more images 112 (FIG. 1) of the unmoving sample 105 as part of each measurement. Between each successive image 112, a high precision vertical motion system (not shown) translates the sample 105 and grating 120 uniformly closer or farther away by a fixed distance or phase step. The motion system is typically expensive, especially if the sample and/or the grating is large or heavy. The motion system can physically move either the sample 105 or the grating 120, and the typical distance is on the order of 0.0025 inches. Each physical movement of the sample 105 or grating 120 is generally referred to herein as a "phase step." FIG. 4a illustrates an exemplary system 400a for producing a phase step by vertically translating the grating 120 relative to the sample 105. FIG. 4b illustrates an exemplary system 400b for producing a phase step by vertically translating the sample 105 relative to the grating 120.

At each point on the sample 105 surface, where a point is defined as the area imaged by one camera pixel, the computer 125 (FIG. 1) measures three or more values of light intensity. The computer 125 can calculate a phase value from the intensity values, as described in U.S. Pat. No. 5,969,819 to Wang, which is hereby incorporated by reference. From the phase value, the computer 125 can calculate the relative height of all points on the sample 105 surface. The calculations assume that the phase step translation distance is precisely a simple fraction of the quantity W defined above, e.g., one-fourth of W if four images are acquired, and that the motion system that translates the grating 120 or sample 105 reproduces that step size precisely. If these conditions are not met, errors are introduced into the analysis. These precision requirements for the motion system generally make the analysis slow and expensive.

Many manufacturing industries require surface flatness measurement of continuously moving samples. For example, where materials, such as paper, are formed, woven, or extruded on a continuous basis, production flows cannot be stopped to measure samples of the materials without inducing flaws into the materials. In addition, some samples cannot readily be stopped and started because of sample characteristics, such as high weight, and/or the requirements of the remainder of the production line. Because the above-described techniques require a stationary support structure to hold the sample in place during data acquisition and/or grating/sample translation, they cannot readily be applied to measure surface flatness of continuously moving samples.

In view of the foregoing, a need exists in the art for a system and method for measuring surface flatness of continuously moving samples. In addition, a need exists for such a system and method to be efficient and cost-effective.

SUMMARY OF THE INVENTION

The invention satisfies the above-described and other needs by providing systems and methods for efficiently and cost-effectively measuring surface flatness of continuously moving samples. Specifically, the invention enables quantification of the surface flatness of continuously moving samples using a shadow moiré image processing technique and phase-sensitive analysis.

In one aspect of the invention, a conveyor can continuously convey a sample along a plane of conveyance. The sample can be any object, any discrete object, or any portion or region of an object for which a surface flatness measurement is desired. For example, the sample can comprise a region of a band of material or a web, such as a reel-to-reel roll of paper. The conveyor can convey the sample beneath a grating disposed at a non-zero angle with respect to the plane of conveyance. A light source, which can be a continuous or pulsed light source, can illuminate the grating and the sample. The interaction of the light, the grating, and the sample can create a shadow moiré fringe pattern that is indicative of the surface flatness of the sample. A camera disposed above the grating can capture, at constant intervals, a sequence of images that each comprise a shadow moiré fringe pattern. The camera can comprise an electronic shutter operable to capture the images with heightened sharpness.

Due to the angled disposition of the grating, the relative distance between the sample and the grating changes with the horizontal translation of the sample. The continuous change in relative distance can introduce a known or unknown phase step between the shadow moiré fringe patterns of each successive image. A computer associated with the camera can process the images to determine phase values of pixels at, and the relative height of the sample surface at, selected pixel locations of the sample. The computer can calculate the phase values, for example, by using the Carré algorithm. The computer can select the pixel locations, for example, based on a known location of the sample during a first of the image acquisitions. Alternatively, the computer can select the pixel locations by creating a brightness image comprising the sample and applying a part location algorithm to the brightness image to identify the pixels corresponding to the sample. Based on the relative height at each pixel location, the computer can calculate a warpage gauge.

In another aspect of the invention, the computer can determine a time at which to begin capturing the sequence of images. For example, the computer can determine the time at which the sample will be located at a pre-determined imaging location. To determine that time, for example, the computer can determine, e.g., using one or more sensors, the distance between the sample and the imaging location and the speed of the sample.

Additional aspects, features, and advantages of the invention will become apparent to those skilled in the art upon consideration of the following detailed description of illustrated embodiments exemplifying the best mode of carrying out the invention as presently perceived.

DETAILED DESCRIPTION OF EXEMPLARY EMBODIMENTS

The invention is directed to systems and methods for measuring sample surface flatness of continuously moving samples. Efficient and cost-effective measurement of sample surface flatness on a production line can help manufacturers in a variety of industries to maximize product quality and reduce costs. It can also help manufacturers to readily recognize processing deficiencies. The manufacturers can be in the electronics, metal fabrication, paper, textile, and/or polymer film industries, for example.

In accordance with an exemplary embodiment of the invention, a conveyor continuously conveys a sample beneath a grating disposed at a non-zero angle with respect to the plane of conveyance. As used herein, the term "sample" refers to an object or a portion of an object for which a surface flatness measurement is desired. The sample can comprise, for example, a mechanical component, such as a printed circuit board, a sheet material, such as paper, or a portion thereof. Due to the angled disposition of the grating, the relative distance between the sample and the grating continuously changes with the horizontal translation of the sample. A camera disposed above the sample and the grating captures, at constant time intervals, a sequence of images. Each image comprises a shadow moiré fringe pattern that is indicative of the surface flatness of the sample. The continuous change in relative distance between the sample and the grating introduces a phase step between the shadow moiré fringe patterns of each successive image. The phase step can be known or unknown.

A computer associated with the camera processes the images to determine phase values of pixels at, and the relative height of the sample surface at, selected pixel locations in the sample. The computer can select the pixel locations, for example, based on a known location of the sample during a first of the image acquisitions. Alternatively, the computer can select the pixel locations by creating a brightness image comprising the sample and applying a part location algorithm to the brightness image to identify the pixels corresponding to the sample.

Turning now to the drawings, in which like numerals indicate like elements throughout the several figures, exemplary embodiments of the invention are described in detail.

Figure 5:
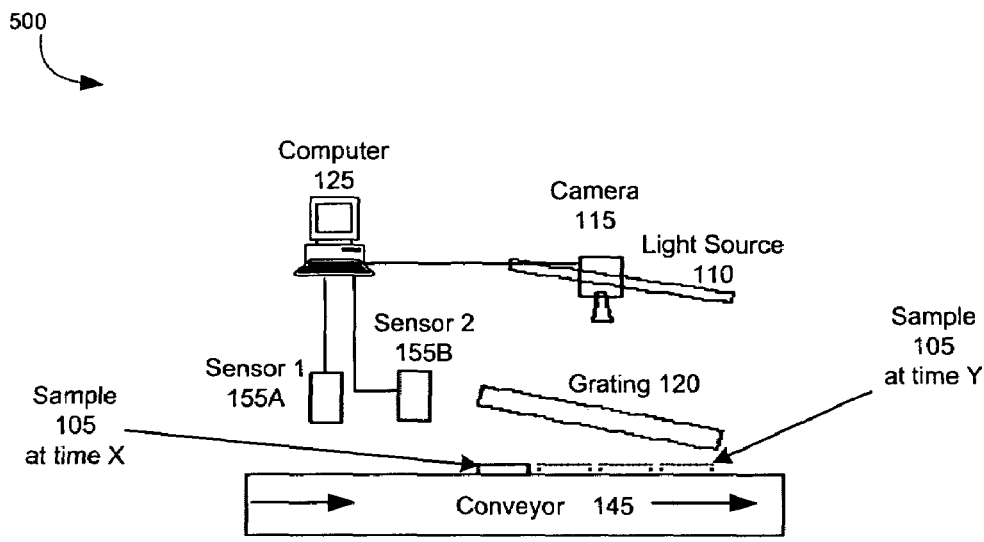
FIG. 5 is an illustration of a side view of a system for measuring surface flatness of a continuously moving sample, according to an exemplary embodiment of the invention.

FIG. 5 is an illustration of a side view of a system 500 for measuring surface flatness of a continuously moving sample 105, according to an exemplary embodiment of the invention. The system 500 comprises a light source 110, a sample 105 resting on a continuously moving conveyor 145, a grating 120 suspended above the sample 105 and the conveyor 145, and a camera 115, e.g., a charge coupled device (CCD) camera, associated with a computer 125. Due to the angled disposition of the grating 120, the relative distance between the sample 105 and the grating 120 continuously changes with the horizontal translation of the sample 105.

The light source 110 illuminates the grating 120 and the sample 105, projecting a shadow of the grating 120 (a "shadow grating") onto the sample 105. The camera 115 captures a sequence of images of the grating 120, the sample 105, and the shadow grating. The overlap of the shadow grating and the real grating 120 in each image is a periodic function of the distance between them. When the surface of the sample 105 is curved or warped, each image comprises a series of dark and light fringes (moiré fringes) as a result of the geometric interference pattern created between the reference grating 120 and the shadow grating. The moiré fringes are indicative of the warpage of the sample 105. In other words, the moiré fringes correspond to contour lines of the topography of the upper surface of the sample 105. Each successive moiré fringe represents a height change of the sample surface of W, the height per fringe. W can be calculated with the following equation:

$$W = \frac{P}{\tan a + \tan b},$$

where P is the pitch of the grating, a is the angle of incidence, and b is the angle of observation.

Figure 1:
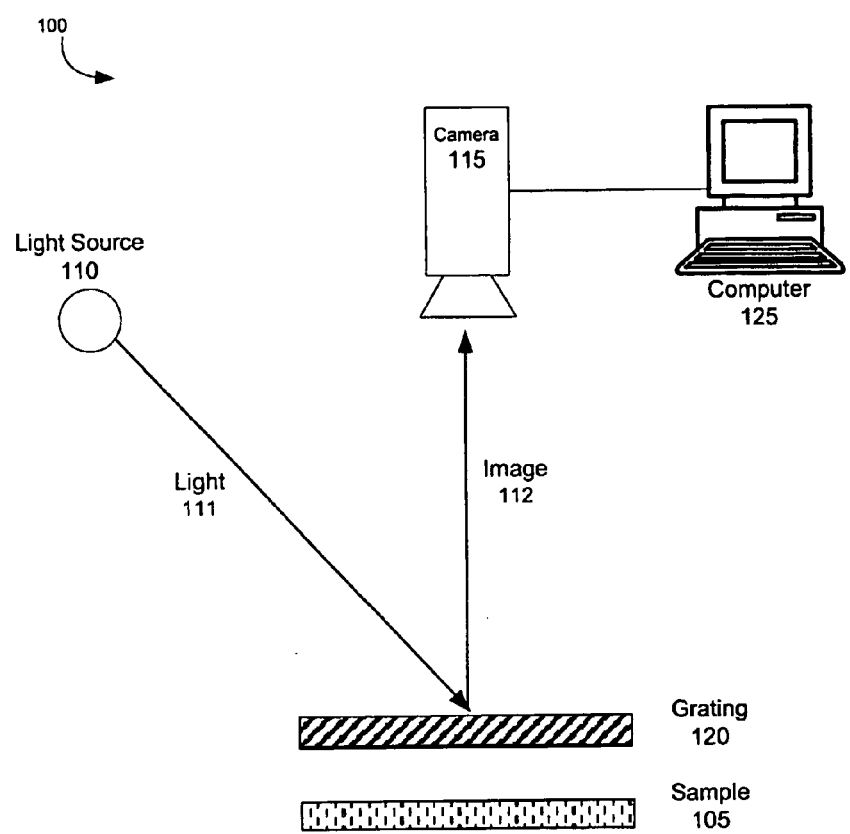
FIG. 1 is an illustration of an exemplary system for measuring surface flatness of a sample utilizing traditional shadow moiré measurement techniques.
Figure 2:
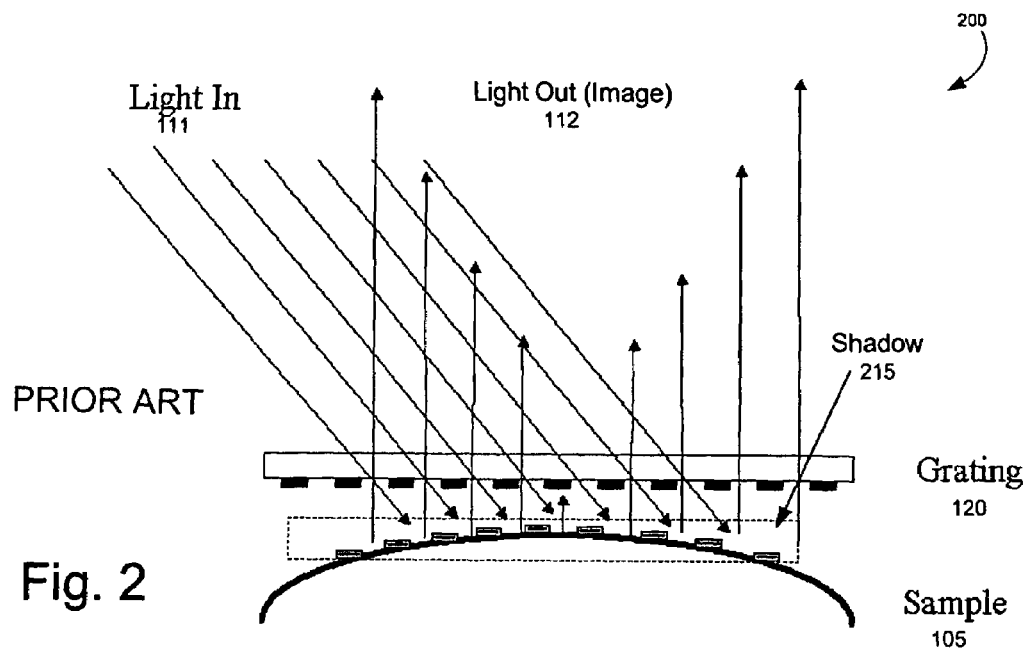
FIG. 2 is an illustration of an exemplary instance of the shadow moiré technique.
Figure 3:
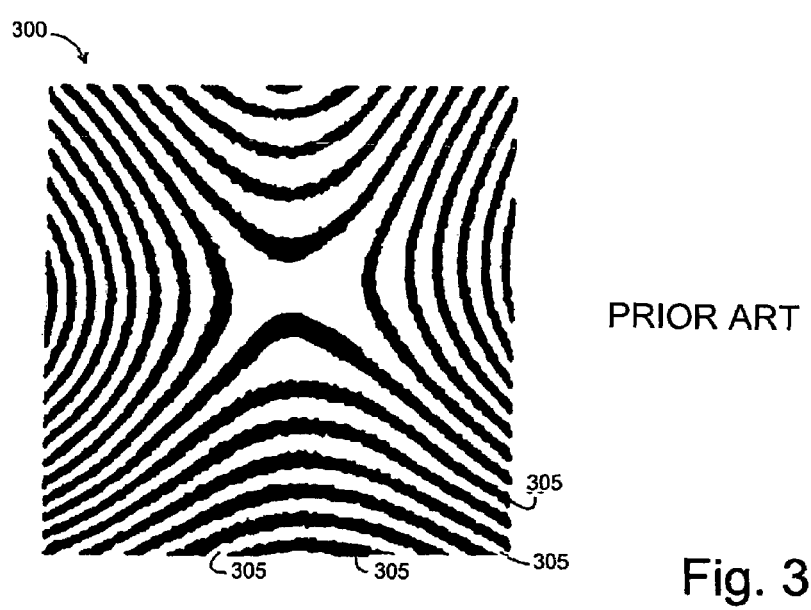
FIG. 3 is a schematic view of an exemplary shadow moiré fringe pattern.
Figure 4A:
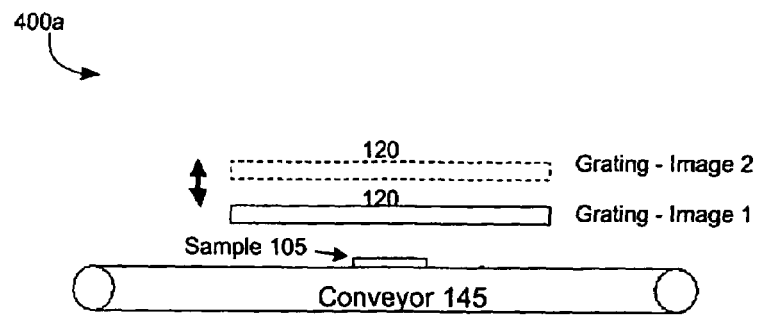
FIG. 4a is an illustration of an exemplary system for producing a phase step by vertically translating the grating relative to the sample.
Figure 4B:
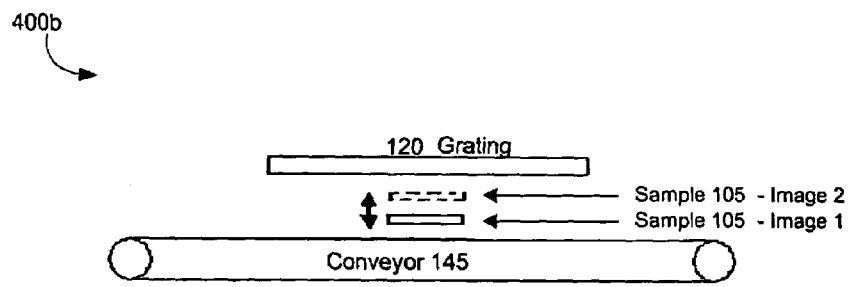
FIG. 4b is an illustration of an exemplary system for producing a phase step by vertically translating the sample relative to the grating.

The continuous change in relative distance between the sample 105 and the grating 120 introduces a phase step, similar to the traditional phase steps described above in conjunction with FIGS. 4a and 4b (in which the phase step was created by vertically translating either the grating 120 or the sample 105), between the shadow moiré fringe patterns of each successive image. The computer 125 associated with the camera 115 comprises software operable to quantify the warpage of the sample 105 from the shadow moiré fringe patterns.

The conveyor 145 can be any apparatus operable to transport the sample 105 from one place to another. For example, the conveyor 145 can be a traditional belt conveyor or a reel-to-reel continuous transport system. By way of illustration only, the conveyor 145 can be a belt conveyor with low or no sidewalls, such as the Dorner 2200 series conveyor, and can comprise a belt having a dark color contrasting with the sample 105.

The grating 120 is of the Ronchi type, comprising a generally planar plate of transparent material that includes multiple parallel and evenly spaced opaque lines extending across the surface of the plate. Typically, the grating 120 has a periodicity of 50 to 500 lines per inch. The center-to-center distance between the lines, the pitch ("P") of the grating, is constant. The grating 120 is disposed at a non-zero angle relative to the plane of motion of the conveyor 145. Typically, the angle is between 0 and 4 degrees. For example, the angle can be 0.43 degrees. A person of skill in the art will recognize that, depending on the grating size, conveyor speed, and data acquisition rate, the grating can be disposed at a suitable angle outside of the typical 0 degrees to 4 degrees range. The angle between the grating plane and the axis normal to the axis of the motion in the plane of the conveyor 145 bed is not a critical feature, but is assumed to be small.

The light source 110 is a continuous or pulsed white light source 100 of the line source type. By way of illustration only, the light source 110 can be a regulated quartz-halogen source, e.g., at 150 watts, focused into a fiber optic light head that emits the light along a straight line by arranging the fibers in the bundle into a one-dimensional array. For example, the light source 100 can be configured to emit at least one pulse of light during each image capture. The light source 110 is disposed beside and above the plane of the conveyor 145 bed, with the axis of the line light source parallel to the axes of the lines in the grating 120 plane. In this position, the angle of illumination does not change significantly as the sample 105 translates along the axis of motion. Change in the angle of illumination would cause W, the height per shadow moiré fringe in the images, to change with position and could significantly complicate the surface flatness measurement. Positioning the light source 110 in an alternative position, for example, in front or behind the grating 120 with respect to sample 105 motion, could introduce greater error into the analysis. It might, however, be acceptable in some applications where the optical system configuration was restricted.

The camera 115 can be any device operable to capture images of the grating 120 and the sample 105. For example, the camera 115 can be a monochrome CCD video camera. By way of illustration only, the camera 115 can be a JAI Progressive Scan camera with 1380×1030 resolution and digital output. The camera 115 can include an electronic shutter. The electronic shutter can control the time over which the camera 115 accumulates light from the grating 120 and the sample 105. The time per frame can be set, for example, at approximately 42 milliseconds, or at other increments of approximately $$\frac{42}{1024}$$

milliseconds, as low as 41 microseconds. The maximum shutter period that can be used is a function of camera 115 resolution, conveyor 145 speed, and camera 115 field of view. For example, if the camera 115 resolution is 1000 pixels in the direction of motion and the field of view is 125 mm, the optical system resolution is 8 pixels per millimeter. If the conveyor 145 speed is 250 millimeters per second, the sample 105 moves 0.25 mm or 2 pixel widths in 1 millisecond. To capture the image with acceptable clarity, the sample 105 should shift less than 1 pixel width while the electronic shutter is open, or 0.5 milliseconds in this example.

The computer 125 can be any device operable to process images captured by the camera 115. For example, the computer 125 can be a traditional personal computer. The computer 125 can comprise input and output ("I/O") devices including a digital frame grabber, such as the Matrox Meteor Digital system. The computer 125 can further comprise a digital I/O board operable to receive sensor signals.

The system 500 further comprises one or more sensors 155, Sensor 1 155A and Sensor 2 155B, disposed above the sample 105 and the conveyor 145 and operable to detect the sample 105 and/or to determine the rate of motion (the speed) of the sample 105. Each sensor 155 can be any type of diffuse photoelectric sensor, including for example, the Ban T18SP6DQ. Each sensor 155 can be associated with the computer 125, which can be further operable to process signals received from each sensor 155.

The size, speed, grating 120 pitch, and other quantitative parameters of elements of the system 500 are interrelated. A person of skill in the art would understand the relationships of these parameters, and thus would be capable of varying any of the parameters over a significant range, depending on the application. As an example of how the parameters can be determined, consider a sample 105 of 4 inches width and 4 inches length moving on a conveyor 145 at 10 inches per second. The camera 115 has a frame rate of 24 frames per second, so it can capture images at 42 millisecond intervals. During a sequence of 4 images, the sample 105 travels a distance of 1.25 inches. The grating 120 must be larger than the length of the sample 105 plus the distance traveled, or 5.25 inches, and wider than the width of the sample 105, 4 inches. If the grating 120 includes 100 lines per inch and the light source 110 illuminates the sample 105 at an angle of 25 degrees, the full fringe cycle is 0.021 inches. To effect a phase step of ¼ phase cycle between each image, the sample-to-grating distance should change by approximately ¼ of a fringe cycle. Thus, to effect a phase step of ¼ phase cycle between each image, the sample-to-grating distance should change by approximately 0.0054 inches over a horizontal distance of 0.42 inches between successive images, or a grating 120 rise of 0.10 inches over a length of 8 inches.

Figure 6:
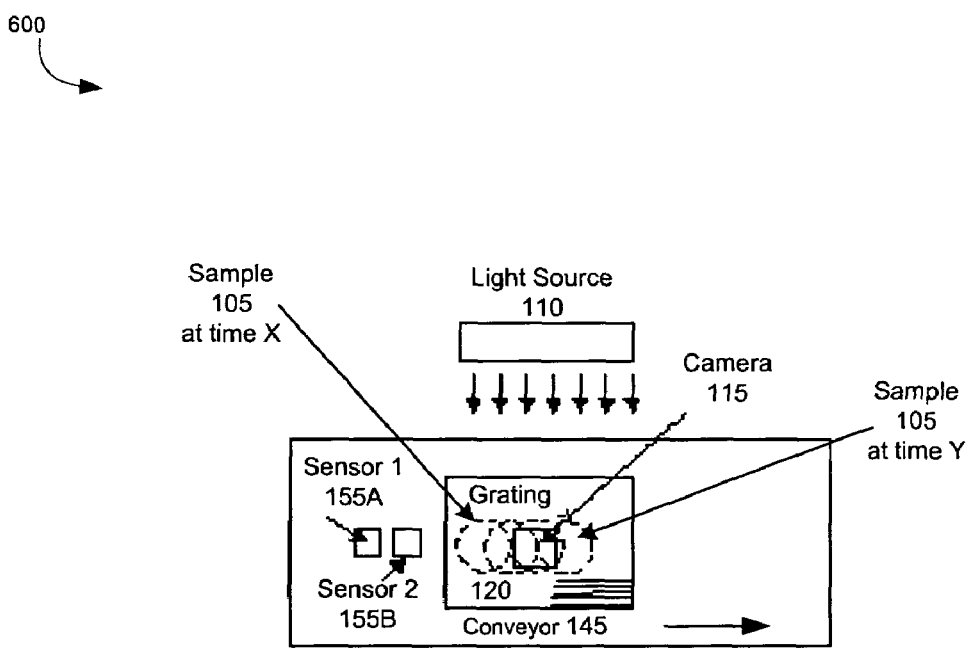
FIG. 6 is an illustration of a top view of an exemplary system for measuring surface flatness of a continuously moving sample, according to an exemplary embodiment of the invention.

FIG. 6 is an illustration of a top view of an exemplary system 600 for measuring surface flatness of a continuously moving sample 105, according to an exemplary embodiment of the invention. The conveyor 145 continuously, horizontally conveys the sample 105 beneath the sensors 155, the grating 120 and the light source 110. The light source 110 illuminates the sample 105 through the grating 120. The camera 115, disposed above the grating 120 and the sample 105, is configured to capture images of the grating 120, the sample 105, and the shadow grating projected onto the sample 105. Each captured image comprises a shadow moiré fringe pattern that is indicative of the surface flatness of the sample 105.

Figure 7:
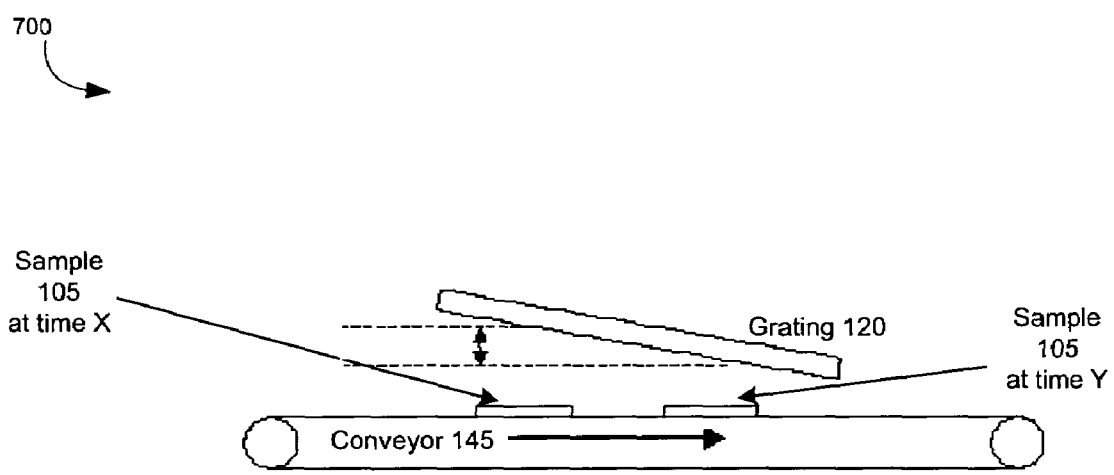
FIG. 7 is an illustration of a system for producing a phase step by horizontally conveying a sample beneath a grating disposed at a non-zero angle relative to the plane of conveyance, according to an exemplary embodiment of the invention.

FIG. 7 is an illustration of a system 700 for producing a phase step by horizontally conveying a sample 105 beneath a grating 120 disposed at a non-zero angle relative to the plane of conveyance, according to an exemplary embodiment of the invention. The conveyor 145 continuously, horizontally translates the sample 105 beneath the grating 120. Due to the angled disposition of the grating 120, the relative distance between the sample 105 and the grating 120 continuously changes with the horizontal translation of the sample 105. The continuous change in relative distance between the sample 105 and the grating 120 introduces a phase step between the shadow moiré fringe patterns of each successive captured image.

Unlike the traditional systems for producing a phase step described above, in conjunction with FIGS. 4a and 4b, the system 700 of FIG. 7 introduces the phase step without stopping motion of the sample 105 or vertically translating either the sample 105 or the grating 120. Thus, the system 700 does not require an expensive, high precision vertical motion system operable to vertically translate the sample 105 or the grating 120. In addition, because the motion of the sample 105 does not have to be stopped, the camera can more readily acquire, and the computer can more readily process, images of the sample 105.

Figure 8:
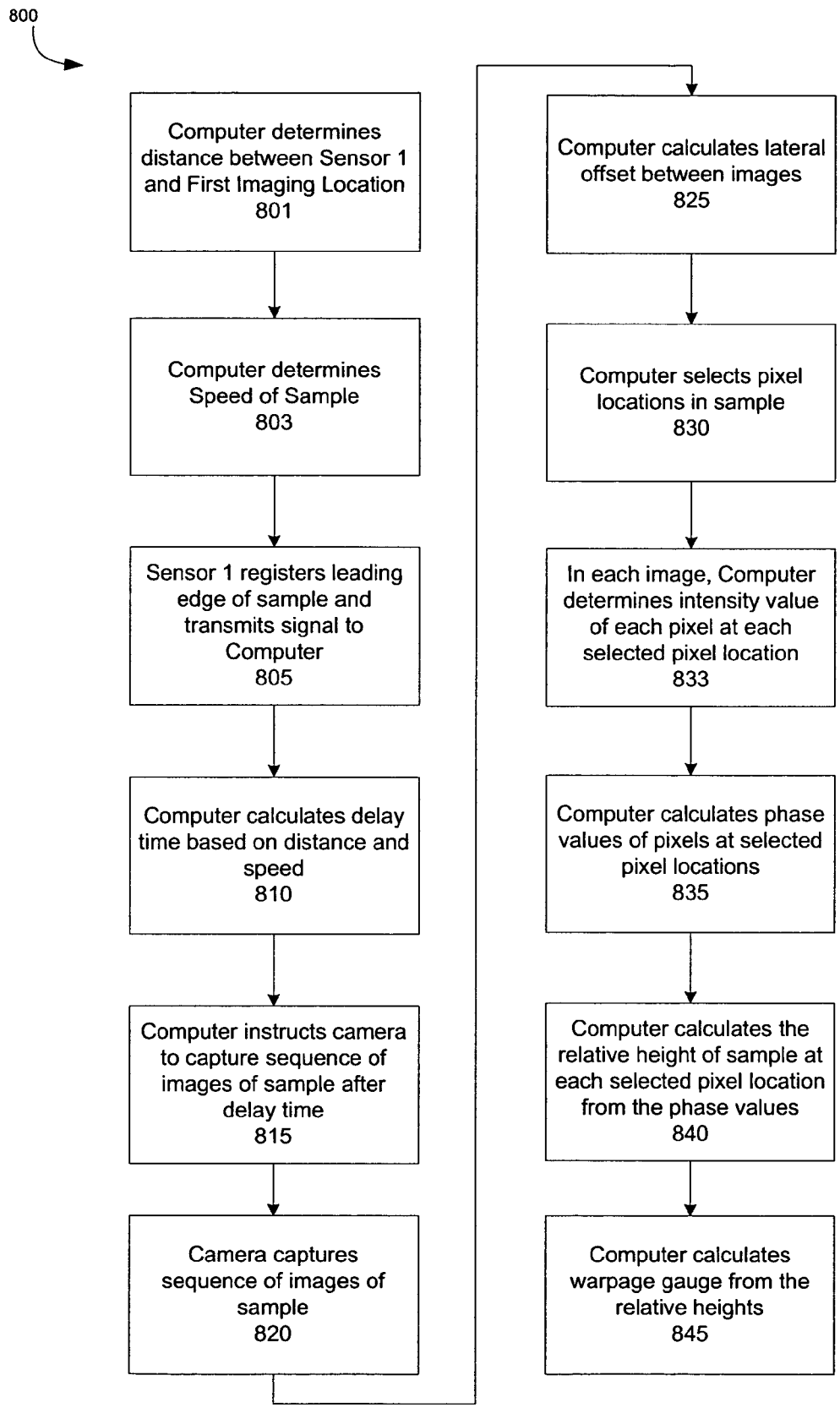
FIG. 8 is a flow chart diagram illustrating steps in a method for measuring surface flatness of a continuously moving sample, according to an exemplary embodiment of the invention.

FIG. 8 is a flow chart diagram illustrating steps in a method 800 for measuring surface flatness of a continuously moving sample 105, according to an exemplary embodiment of the invention. The exemplary method 800 is merely illustrative and, in alternative embodiments of the invention, certain steps can be performed in a different order, in parallel with one another, certain steps can be omitted entirely, and/or certain additional steps can be performed.

In step 801, the computer 125 determines the distance between Sensor 1 155A and a first imaging location, the first imaging location being disposed beneath the grating 120 and in a field of view of the camera 115. The first imaging location is a location at which the camera 115 can capture the first in a sequence of images comprising shadow moiré fringe patterns indicative of the surface flatness of the sample 105. In step 803, the computer 125 determines the speed of the sample 105. The computer 125 can determine the speed of the sample 105, for example, by interacting with an external sensor 155 associated with the conveyor 145. In step 805, Sensor 1 155A registers the leading edge of the sample 105 at a first time and transmits a signal to the computer 125.

In step 810, the computer 125 calculates a delay time equaling the time required for the sample 105 to travel, at its predetermined speed, from Sensor 1 155A to the first imaging location. To calculate the delay time, for example, the computer 125 can divide the distance between Sensor 1 and the first imaging location by the speed of the sample 105. In step 815, the computer 125 instructs the camera 115 to capture a sequence of images of the sample 105 after the delay time. In other words, the computer 125 instructs the camera 115 to start capturing a sequence of images of the sample 105 at a time equal to the first time plus the delay time. Thus, the camera 115 will start capturing the sequence of images when the sample 105 reaches the first imaging location.

In step 820, the camera 115 captures the sequence of images at a constant time interval. In accordance with the electronic shutter of the camera 115, the constant time interval can be, for example, 42 milliseconds. During the sequence of image captures, the conveyor 145 continuously, horizontally translates the sample 105 beneath the grating 120. Due to the angled disposition of the grating 120, the relative distance between the sample 105 and the grating 120 continuously changes with the horizontal translation of the sample 105. The continuous change in relative distance between the sample 105 and the grating 120 introduces a phase step between the shadow moiré fringe patterns of each successive captured image. That phase step can either be known or unknown to the computer 125.

In step 825, the computer 125 calculates the lateral offset of the sample 105, in pixels, between each successive image acquisition. For example, the computer 125 can calculate the lateral offset using the following equation: LO=INT (V*$T_x$*R), where LO is the lateral offset, V is the speed of the sample 105, $T_x$ is the constant time interval between each image, R is the lateral resolution of the camera 115, and INT rounds the product of V, $T_x$, and R to the nearest integer value. By way of example only, if V is 200 mm/second, $T_x$ is 0.042 seconds, and R is 0.95 pixels per mm, LO would equal 8 pixels. In step 830, the computer 125 selects pixel locations (x,y) in the sample 105. The pixel locations can be selected, e.g., based on the known location of the sample 105 during the first image capture—the first imaging location. For example, the computer 125 can select a set of pixel locations in the sample 105 of the first captured image and then determine the corresponding set of pixel locations in the sample 105 in each of the subsequently captured images using the lateral offset.

In step 833, the computer 125 determines, in each captured image, the intensity value of each pixel at each selected pixel location. In an alternative embodiment of the invention, the computer 125 can determine the intensity value of each pixel, in each captured image, upon image capture or at another suitable time. In step 835, the computer 125 calculates the phase value of each pixel at each selected pixel location by substituting the determined intensity values and lateral offset into one or more phase calculation algorithms. The form of the phase calculation algorithm(s) can vary depending on whether the computer 125 knows the phase step.

For example, if the camera 115 captured a sequence of four images with a known phase step of 90°, the computer 125 can substitute the intensity values and lateral offset into the following "standard phase calculation algorithm":

$$\phi(x,y)=\tan^{-1}((I_2(x+LO,y)-I_4(x+3*LO,y))/((I_1(x,y)-I_3(x+2*LO,y))),$$

where $\phi$ (x,y) is the phase value of the pixel at pixel location (x,y), $I_1$(x,y) is the intensity value of the pixel at pixel location (x,y) in the first image, $I_2$ (x, y) is the intensity value of the pixel at pixel location (x,y) in the second image, $I_3$ is the intensity value of the pixel at pixel location (x,y) in the third image, $I_4$ is the intensity value of the pixel at pixel location (x,y) in the fourth image, and LO is the lateral offset.

Alternatively, if the camera 115 captured a sequence of four images with an unknown phase step, the computer 125 can substitute the intensity values and lateral offset into the following algorithm, referred to herein as the "Carré algorithm":

$$\phi = \tan^{-1}\left[\left(\frac{(I_1(x,y)-I_4(x+3*LO,y))-(I_2(x+LO,y)-I_3(x+2*LO,y))}{(I_2(x+LO,y)+I_3(x+2*LO,y))-(I_1(x,y)+I_4(x+3*LO,y))}\right)\tan\theta\right],$$

where $\phi$ (x,y) is the phase value of the pixel at pixel location (x,y), $I_1$(x,y) is the intensity value of the pixel at pixel location (x,y) in the first image, $I_2$ (x,y) is the intensity value of the pixel at pixel location (x,y) in the second image, $I_3$ is the intensity value of the pixel at pixel location (x,y) in the third image, $I_4$ is the intensity value of the pixel at pixel location (x,y) in the fourth image, LO is the lateral offset, and $$\theta = \cos^{-1}\left(\frac{(I_1(x,y)-I_4(x+3*LO,y))-(I_2(x+LO,y)-I_3(x+2*LO,y))}{2(I_2(x+LO,y)+I_3(x+2*LO,y))}\right).$$

The Carré algorithm assumes that the phase step $\theta$ is unknown but constant. Thus, the equations describing pixel intensity values for the four phase stepped images can be written:

$$I_1=I_0+A\cos(\phi+\theta)$$

$$I_2=I_0+A\cos(\phi+2\theta)$$

$$I_3=I_0+A\cos(\phi+3\theta)$$

$$I_4=I_0+A\cos(\phi+4\theta),$$

where $I_0$ is the brightness value of each pixel and A is the amplitude of the interference term in each intensity equation. $I_0$ and A are constants that are different for each pixel position. $I_0$ and A depend on the intensity of illumination, diffuse reflectivity and fringe contrast, among other factors.

Solving for θ:

$$\theta = \cos^{-1}\left(\frac{(I_1 - I_4) - (I_2 - I_3)}{2(I_2 - I_3)}\right)$$

To determine the phase, φ:

$$\phi = \tan^{-1}\left[\left(\frac{(I_1 - I_4) - (I_2 - I_3)}{(I_2 + I_3) - (I_1 + I_4)}\right)\tan\theta\right]$$

The brightness value of each pixel, $I_0$, can be calculated in a similar fashion.

The advantage of the Carré algorithm for calculating the phase of a moving sample is that it relaxes the relationship between the vertical phase step and the horizontal motion of the sample 105. This makes construction and maintenance of the system much simpler. If the phase step must be exactly 90 degrees, as taught in the standard phase step algorithm, then a precise relationship is required between the speed of the sample 105, the angle of the grating 120, and the interval between image acquisitions, which may be difficult to create and maintain, for example, if conveyor 145 speed changes. With the Carré algorithm, the phase can be calculated correctly even if the speed of the sample 105 or the grating 120 angle varies over a wide range.

In step 840, the computer 125 calculates the relative height of the sample surface at each selected pixel location from the phase values. For example, the computer 125 can substitute each phase value into the following algorithm:

$$Z(x,y) = W^*(N + \phi(x,y)/2\pi),$$

where Z (x,y) is the relative height of the sample surface at pixel location (x,y), W is the fringe value, N is the fringe order, and φ (x,y) is the phase of the pixel at location (x,y). The fringe order is an arbitrary integer number assigned to a particular fringe to indicate its order in the series of fringes in the image. For example, a series of four fringes can be assigned fringe orders of 0, 1, 2, and 3. Alternatively, the series of fringes can be assigned fringe orders of 2, 3, 4, and 5. Other suitable algorithms for determining the relative height of the sample surface at a pixel location based on a phase value will be readily apparent to a person of skill in the art. The relative height value of a particular pixel indicates the height of the sample surface at the pixel relative to the height at all other points on the sample surface.

In step 845, the computer 125 calculates one or more warpage gauges from the set of Z (x,y) values obtained in step 840. For example, the warpage gauge can be the coplanarity (COP) gauge calculated by: COP=MAX (Z (x,y))−MIN (Z (x,y)), where MAX (Z (x,y)) determines the maximum of the Z (x,y) values and MIN (Z (x,y)) determines the minimum of the Z (x,y) values. Other suitable warpage gauges, such as the "Bow" gauge (calculated by dividing the magnitude of displacement along the edge of the sample 105 by the length of the edge) and the "Twist" gauge (calculated by dividing the magnitude of displacement of 1 corner of the sample 105 (holding the other 3 corners in the same plane) by the length of the diagonal of the sample 105), are well known in the art.

Figure 9:
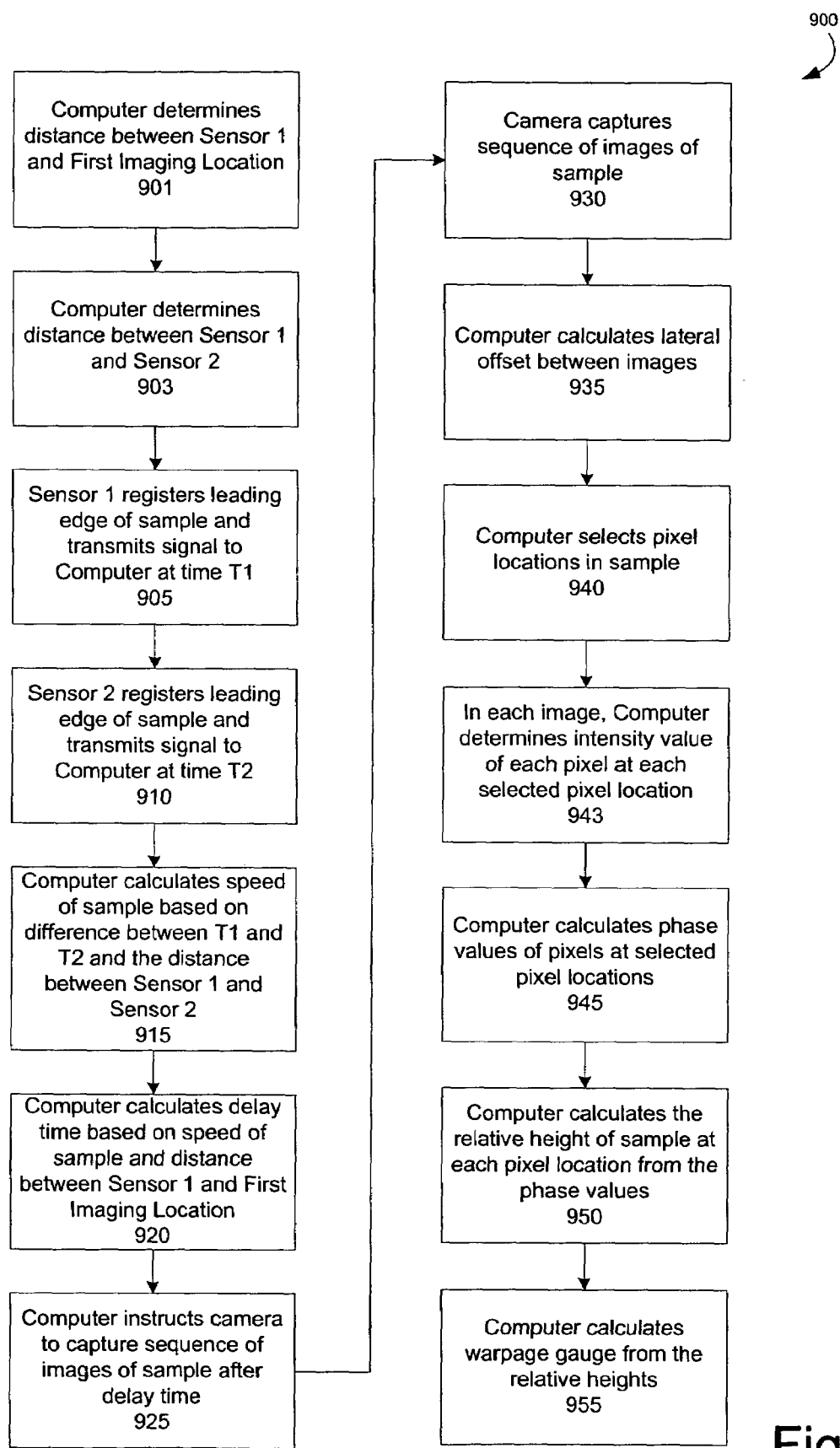
FIG. 9 is a flow chart diagram illustrating steps in a method for measuring surface flatness of a continuously moving sample, according to an alternative exemplary embodiment of the invention.

FIG. 9 is a flow chart diagram illustrating steps in a method 900 for measuring surface flatness of a continuously moving sample 105, according to an alternative exemplary embodiment of the invention. The exemplary method 900 is merely illustrative and, in alternative embodiments of the invention, certain steps can be performed in a different order, in parallel with one another, certain steps can be omitted entirely, and/or certain additional steps can be performed.

In step 901, the computer 125 determines the distance between Sensor 1 155A and the first imaging location, the first imaging location being disposed beneath the grating 120 and in a field of view of the camera 115. The first imaging location is a location at which the camera 115 can capture the first in a sequence of images comprising shadow moiré fringe patterns indicative of the surface flatness of the sample 105. In step 903, the computer 125 determines the distance between Sensor 1 155A and Sensor 2 155B. In step 905, Sensor 1 155A registers the leading edge of the sample 105 at a time T1 and transmits a signal to the computer 125. In step 910, Sensor 2 155B registers the leading edge of the sample 105 at a time T2 and transmits a signal to the computer 125.

In step 915, the computer 125 calculates the speed of the sample 105 based on the difference between T1 and T2 and the distance between Sensor 1 155A and Sensor 2 155B. For example, to calculate the speed of the sample 105, the computer 125 can divide the distance between Sensor 1 155A and Sensor 2 155B by the difference between T1 and T2. In step 920, the computer 125 calculates a delay time equaling the time required for the sample 105 to travel, at its pre-determined speed, from Sensor 1 155A to the first imaging location. To calculate the delay time, for example, the computer 125 can divide the distance between Sensor 1 and the first imaging location by the speed of the sample 105.

In step 925, the computer 125 instructs the camera 115 to capture a sequence of images of the sample 105 after the delay time. In other words, the computer 125 instructs the camera 115 to start capturing a sequence of images of the sample 105 at a time equal to time T1 plus the delay time. Thus, the camera 115 will start capturing the sequence of images when the sample 105 reaches the first imaging location.

In step 930, the camera 115 captures the sequence of images at a constant time interval. In accordance with the electronic shutter of the camera 115, the constant time interval can be, for example, 42 milliseconds. During the sequence of image captures, the conveyor 145 continuously, horizontally translates the sample 105 beneath the grating 120. Due to the angled disposition of the grating 120, the relative distance between the sample 105 and the grating 120 continuously changes with the horizontal translation of the sample 105. The continuous change in relative distance between the sample 105 and the grating 120 introduces a phase step between the shadow moiré fringe patterns of each successive captured image. That phase step can either be known or unknown to the computer 125.

In step 935, the computer 125 calculates the lateral offset of the sample 105, in pixels, between each successive image acquisition. For example, the computer 125 can calculate the lateral offset using the following equation: LO=INT ($V^*T_x^*R$), where LO is the lateral offset, V is the speed of the sample 105, $T_x$ is the constant time interval between each image, R is the lateral resolution of the camera 115, and INT rounds the product of V, $T_x$, and R to the nearest integer value. In step 940, the computer 125 selects pixel locations (x,y) in the sample 105. The pixel locations can be selected, e.g., based on the known location of the sample 105 during the first image capture—the first imaging location. For example, the computer 125 can select a set of pixel locations in the sample 105 of the first captured image and then determine the corresponding set of pixel locations in the sample 105 in each of the subsequently captured images using the lateral offset.

In step 943, the computer 125 determines, in each captured image, the intensity value of each pixel at each selected pixel location. In an alternative embodiment of the invention, the computer 125 can determine the intensity value of each pixel, in each captured image, upon image capture or at another suitable time. In step 945, the computer 125 calculates the phase value of each pixel at each selected pixel location by substituting the determined intensity values and lateral offset into one or more phase calculation algorithms. The form of the phase calculation algorithm(s) can vary depending on whether the computer 125 knows the phase step.

For example, if the camera 115 captured a sequence of four images with a known phase step of 90°, the computer 125 can substitute the intensity values and lateral offset into the standard phase calculation algorithm. Alternatively, if the camera 115 captured a sequence of four images with an unknown phase step, the computer 125 can substitute the intensity values and lateral offset into the Carré algorithm.

In step 950, the computer 125 calculates the relative height of the sample surface at each selected pixel location from the phase values. For example, the computer 125 can substitute each phase value into the following algorithm: $Z(x,y)=W*(N+\phi(x,y)/2\pi)$, where $Z(x,y)$ is the relative height of the sample surface at pixel location (x,y), W is the fringe value, N is the fringe order, and $\phi(x,y)$ is the phase of the pixel at location (x,y). The fringe order is an arbitrary integer number assigned to a particular fringe to indicate its order in the series of fringes in the image. For example, a series of four fringes can be assigned fringe orders of 0, 1, 2, and 3. Alternatively, the series of fringes can be assigned fringe orders of 2, 3, 4, and 5. Other suitable algorithms for determining the relative height of the sample surface at a pixel location based on a phase value will be readily apparent to a person of skill in the art. The relative height value of a particular pixel indicates the height of the sample surface at the pixel relative to the height at all other points on the sample surface.

In step 955, the computer 125 calculates one or more warpage gauges from the set of Z (x,y) values obtained in step 950. For example, the warpage gauge can be the coplanarity (COP) gauge calculated by: COP=MAX (Z (x,y))−MIN (Z (x,y)), where MAX (Z (x,y)) determines the maximum of the Z (x,y) values and MIN (Z (x,y)) determines the minimum of the Z (x,y) values. Other suitable warpage gauges, such as the "Bow" gauge and the "Twist" gauge, are well known in the art.

Figure 10:
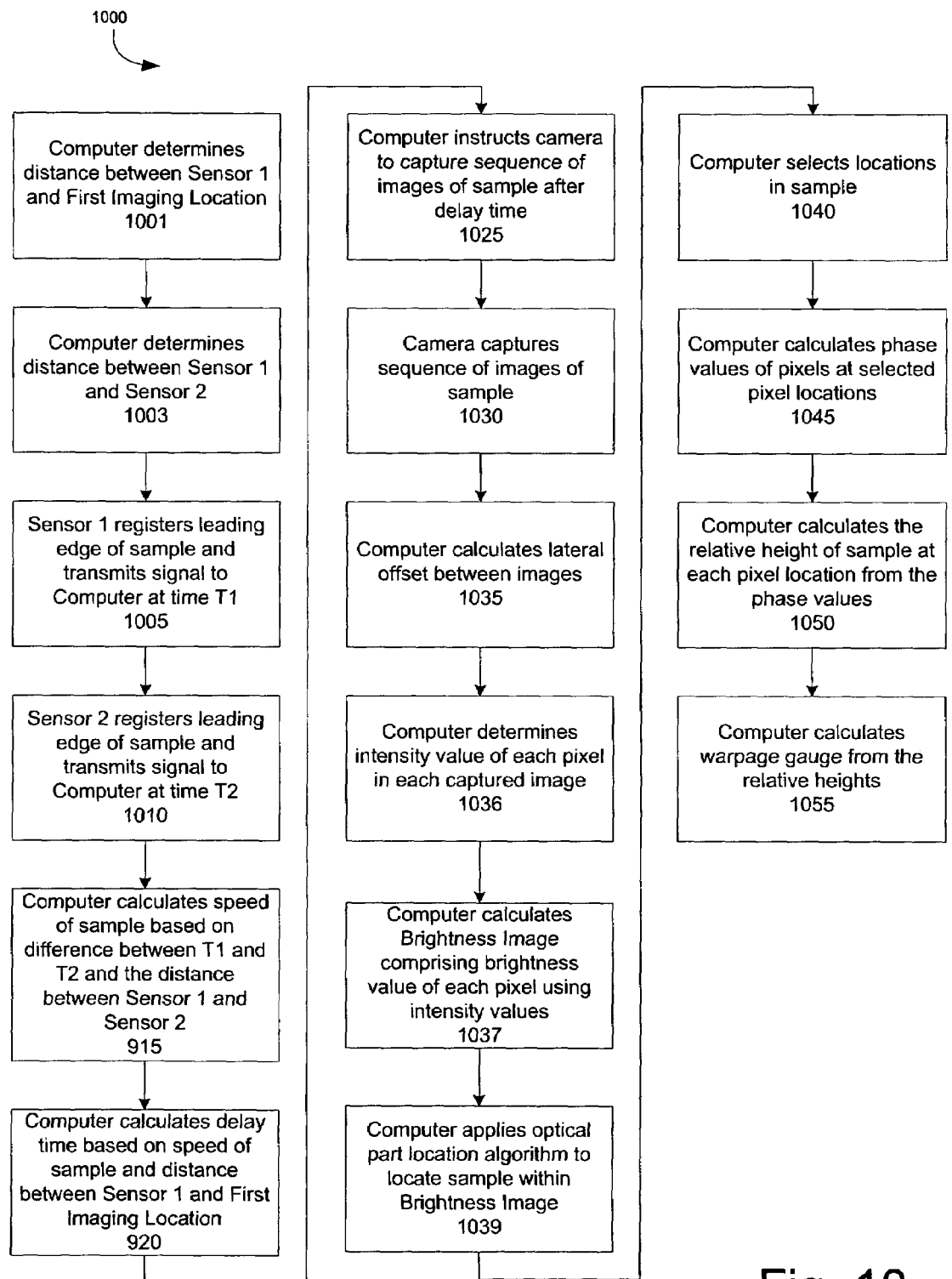
FIG. 10 is a flow chart diagram illustrating steps in a method for measuring surface flatness of a continuously moving sample, according to an alternative exemplary embodiment of the invention.

FIG. 10 is a flow chart diagram illustrating steps in a method 1000 for measuring surface flatness of a continuously moving sample 105, according to an alternative exemplary embodiment of the invention. The exemplary method 1000 is merely illustrative and, in alternative embodiments of the invention, certain steps can be performed in a different order, in parallel with one another, certain steps can be omitted entirely, and/or certain additional steps can be performed.

In step 1001, the computer 125 determines the distance between Sensor 1 155A and a first imaging location, the first imaging location being disposed beneath the grating 120 and in a field of view of the camera 115. The first imaging location is a location at which the camera 115 can capture the first in a sequence of images comprising shadow moiré fringe patterns indicative of the surface flatness of the sample 105. In step 1003, the computer 125 determines the distance between Sensor 1 155A and Sensor 2 155B. In step 1005, Sensor 1 155A registers the leading edge of the sample 105 at a time T1 and transmits a signal to the computer 125. In step 1010, Sensor 2 155B registers the leading edge of the sample 105 at a time T2 and transmits a signal to the computer 125.

In step 1015, the computer 125 calculates the speed of the sample 105 based on the difference between T1 and T2 and the distance between Sensor 1 155A and Sensor 2 155B. For example, to calculate the speed of the sample 105, the computer 125 can divide the distance between Sensor 1 155A and Sensor 2 155B by the difference between T1 and T2. In step 1020, the computer 125 calculates a delay time equaling the time required for the sample 105 to travel, at its pre-determined speed, from Sensor 1 155A to the first imaging location. To calculate the delay time, for example, the computer 125 can divide the distance between Sensor 1 and the first imaging location by the speed of the sample 105.

In step 1025, the computer 125 instructs the camera 115 to capture a sequence of images of the sample 105 after the delay time. In other words, the computer 125 instructs the camera 115 to start capturing a sequence of images of the sample 105 at a time equal to time T1 plus the delay time. Thus, the camera 115 will start capturing the sequence of images when the sample 105 reaches the first imaging location.

In step 1030, the camera 115 captures the sequence of images at a constant time interval. In accordance with the electronic shutter of the camera 115, the constant time interval can be, for example, 42 milliseconds. During the sequence of image captures, the conveyor 145 continuously, horizontally translates the sample 105 beneath the grating 120. Due to the angled disposition of the grating 120, the relative distance between the sample 105 and the grating 120 continuously changes with the horizontal translation of the sample 105. The continuous change in relative distance between the sample 105 and the grating 120 introduces a phase step between the shadow moiré fringe patterns of each successive captured image. That phase step can either be known or unknown to the computer 125.

In step 1035, the computer 125 calculates the lateral offset of the sample 105, in pixels, between each successive image acquisition. For example, the computer 125 can calculate the lateral offset using the following equation: $LO=INT(V*T_x*R)$, where LO is the lateral offset, V is the speed of the sample 105, $T_x$ is the constant time interval between each image, R is the lateral resolution of the camera 115, and INT rounds the product of V, $T_x$, and R to the nearest integer value.

In step 1040, the computer 125 determines the intensity value of each pixel in each captured image. In step 1037, the computer 125 uses the intensity values to calculate a brightness image comprising the brightness value of each pixel. The brightness image is equivalent to an image comprising the sample 105, illuminated by the light source 110, without any moiré fringes. The brightness image can be used, for example, in determining the precise location of the sample 105 in each image. Such a determination allows the computer 125 to more accurately determine the pixel locations at which to evaluate surface flatness of the sample 105. Traditional image progressing algorithms for locating a known object, e.g., the sample 105, in an image, perform poorly when applied to images comprising moiré fringes. Such algorithms are generically referred to herein as "optical part location algorithms," which are well-known in the art. An example of a commercially available part location algorithm is the Matrox ActiveMIL PartFinder control. By creating a brightness image without moiré fringes, an optical part location algorithm can more accurately determine the precise location of the sample 105 in each image.

To create a brightness image, the computer 125 determines the brightness value at each pixel location, B (x,y). If, in step 1030, the camera 115 captured a sequence of four images, for example, the computer can calculate the brightness value at each pixel location by substituting the intensity value of each pixel at each pixel location into the following equation:

$$B(x,y) = (I_1(x,y) + I_2(x+LO,y) + I_3(x+2*LO,y) + I_4(x+3*LO,y))/4,$$

where $I_1(x,y)$ is the intensity value of the pixel at pixel location (x,y) in the first image, $I_2$ (x,y) is the intensity value of the pixel at pixel location (x,y) in the second image, $I_3$ is the intensity value of the pixel at pixel location (x,y) in the third image, $I_4$ is the intensity value of the pixel at pixel location (x,y) in the fourth image, and LO is the lateral offset. This brightness value equation can generally be applied regardless of the phase step.

In step 1039, the computer 125 applies an optical part location algorithm to locate the sample 105 within the brightness image. In step 1040, the computer 125 selects pixel locations (x,y) in the sample 105. The pixel locations can be selected based on the location of the sample 105 determined in step 1039 by the optical part location algorithm. The computer 125 identifies the pixel locations in the first of the captured images, and in step 1045, the computer 125 calculates the phase value of each pixel at each selected pixel location by substituting the determined intensity values of each pixel at each pixel location and the lateral offset into one or more phase calculation algorithms. The form of the phase calculation algorithm(s) can vary depending on whether the computer 125 knows the phase step.

For example, if the camera 115 captured a sequence of four images with a known phase step of 90°, the computer 125 can substitute the intensity values and lateral offset into the standard phase calculation algorithm. Alternatively, if the camera 115 captured a sequence of four images with an unknown phase step, the computer 125 can substitute the intensity values and lateral offset into the Carré algorithm.

In step 1050, the computer 125 calculates the relative height of the sample surface at each selected pixel location from the phase values. For example, the computer 125 can substitute each phase value into the following algorithm: $Z(x,y) = W*(N+\phi(x,y)/2\pi)$, where Z (x,y) is the relative height of the sample surface at pixel location (x,y), W is the fringe value, N is the fringe order, and $\phi$ (x,y) is the phase of the pixel at location (x,y). The fringe order is an arbitrary integer number assigned to a particular fringe to indicate its order in the series of fringes in the image. For example, a series of four fringes can be assigned fringe orders of 0, 1, 2, and 3. Alternatively, the series of fringes can be assigned fringe orders of 2, 3, 4, and 5. Other suitable algorithms for determining the relative height of the sample surface at a pixel location based on a phase value will be readily apparent to a person of skill in the art. The relative height value of a particular pixel indicates the height of the sample surface at the pixel relative to the height at all other points on the sample surface.

In step 1055, the computer 125 calculates one or more warpage gauges from the set of Z (x,y) values obtained in step 950. For example, the warpage gauge can be the coplanarity (COP) gauge calculated by: COP=MAX (Z (x,y))−MIN (Z (x,y)), where MAX (Z (x,y)) determines the maximum of the Z (x,y) values and MIN (Z (x,y)) determines the minimum of the Z (x,y) values. Other suitable warpage gauges, such as the "Bow" gauge and the "Twist" gauge, are well known in the art.

Figure 11:
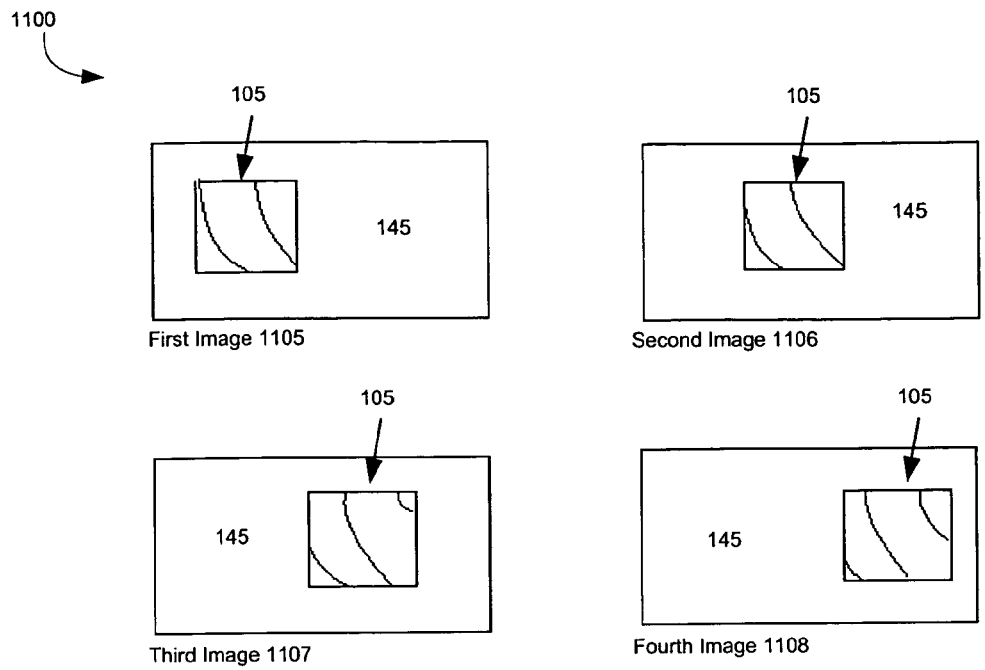
FIG. 11 is an illustration of a sequence of images captured in an exemplary system for measuring surface flatness of a continuously moving sample, according to an exemplary embodiment of the invention.

FIG. 11 is an illustration of a sequence 1100 of images 1105-1108 captured in an exemplary system for measuring surface flatness of a continuously moving sample 105, according to an exemplary embodiment of the invention. The conveyor 145 continuously, horizontally translates the sample 105. Due to the angled disposition of the grating 120, the relative distance between the sample 105 and the grating 120 continuously changes with the horizontal translation of the sample 105. The camera captures a sequence of images 1105-1108 of the continuously moving sample 105, at a constant time interval. Each image comprises a shadow moiré fringe pattern that is indicative of the surface flatness of the sample 105. The continuous change in relative distance between the sample 105 and the grating 120 introduces a phase step between the shadow moiré fringe patterns of each successive captured image.

As illustrated in FIG. 11, in each successive image 1105-1108, the sample 105 is laterally offset relative to the immediately preceding image. For example, the sample 105 location in the second image 1106 is laterally offset relative to the sample 105 location in the first image 1105. The computer can calculate the lateral offset, in pixels, based on the speed of the sample 105, the constant time interval between each image, and the lateral resolution of the camera 115.

Figure 12:
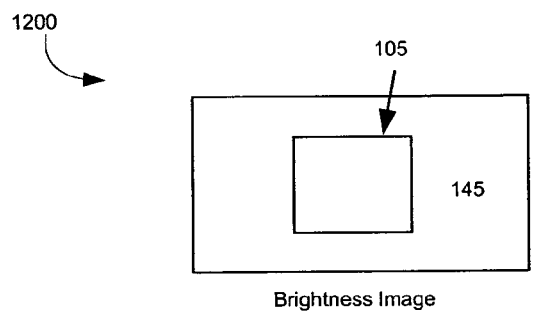
FIG. 12 is an illustration of a brightness image generated in accordance with an exemplary embodiment of the invention.

FIG. 12 is an illustration of a brightness image 1200 generated in accordance with an exemplary embodiment of the invention. The brightness image is equivalent to an image comprising the sample 105 (resting on the conveyor 145), illuminated by the light source 110, without any moiré fringes. The brightness image can be used, for example, in determining the precise location of the sample 105 in each image. Such a determination allows the computer 125 to more accurately determine the pixel locations at which to evaluate surface flatness of the sample 105.

The computer 125 can create a brightness image 1200, for example, by determining the brightness value at each pixel location, B (x,y), of the captured images. For example, if, as illustrated in FIG. 11, the camera 115 captures a sequence of four images, the computer 125 can calculate the brightness value at each pixel location by substituting the intensity value of each pixel at each pixel location into the following equation:

$$B(x,y) = (I_1(x,y) + I_2(x+LO,y) + I_3(x+2*LO,y) + I_4(x+3*LO,y))/4,$$

where $I_1(x,y)$ is the intensity value of the pixel at pixel location (x,y) in the first image, $I_2$ (x,y) is the intensity value of the pixel at pixel location (x,y) in the second image, $I_3$ is the intensity value of the pixel at pixel location (x,y) in the third image, $I_4$ is the intensity value of the pixel at pixel location (x,y) in the fourth image, and LO is the lateral offset. This brightness value equation can generally be applied regardless of the phase step.

Figure 13:
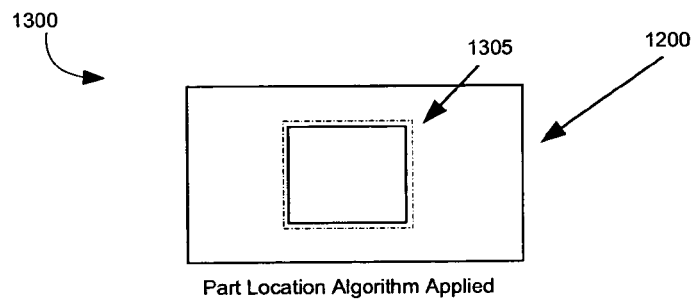
FIG. 13 is an illustration of an optical part location algorithm result generated in accordance with an exemplary embodiment of the invention.

FIG. 13 is an illustration of an optical part location algorithm result 1300 generated in accordance with an exemplary embodiment of the invention. Upon generating a brightness image 1200, the computer 125 can apply an optical part location algorithm to locate the sample 105 within the brightness image 1200.

Figure 14:
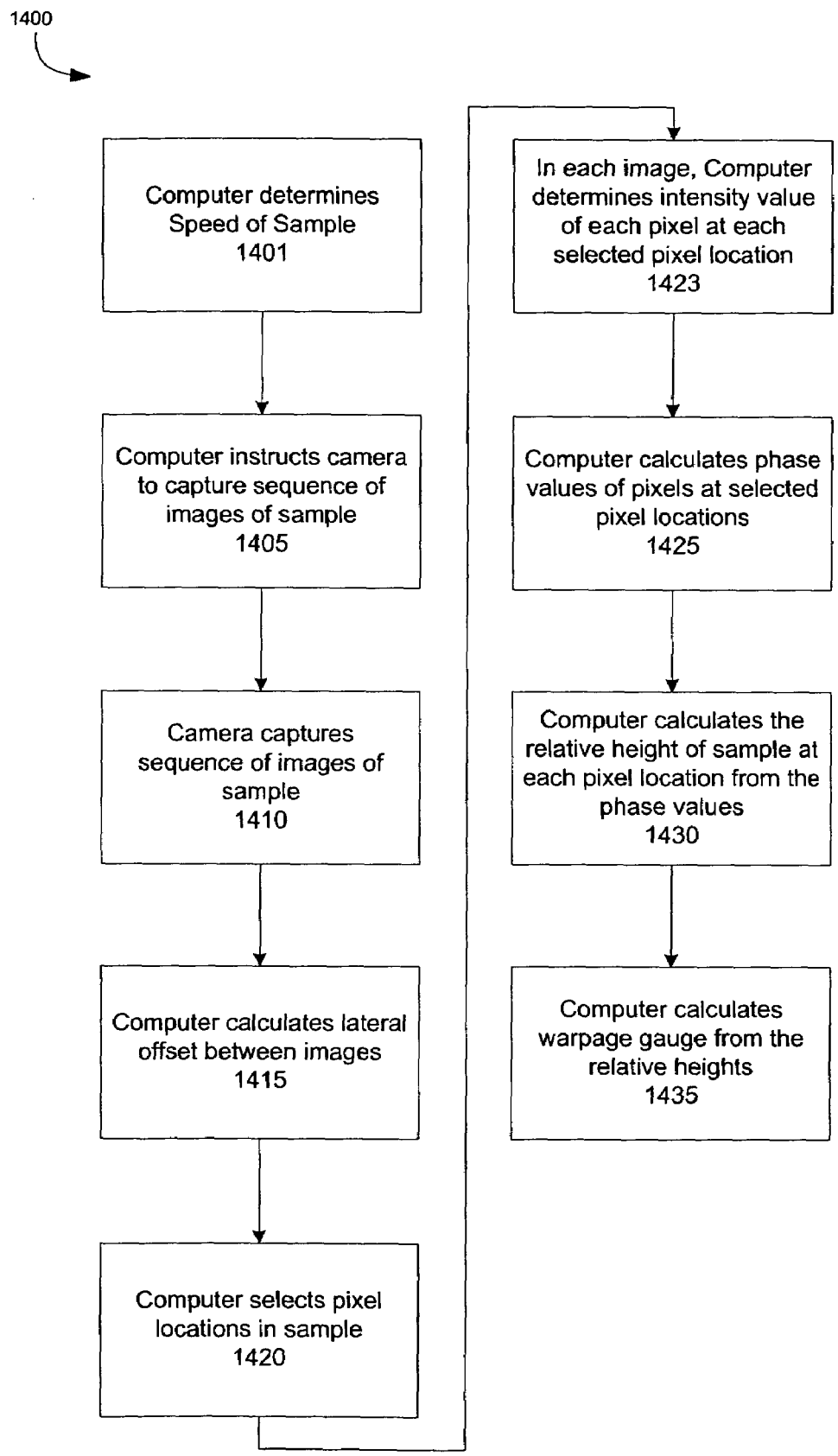
FIG. 14 is a flow chart diagram illustrating steps in a method for measuring surface flatness of a continuously moving sample, according to an alternative exemplary embodiment of the invention.

FIG. 14 is a flow chart diagram illustrating steps in a method 1400 for measuring surface flatness of a continuously moving sample 105, according to an alternative exemplary embodiment of the invention. The exemplary method 1400 is merely illustrative and, in alternative embodiments of the invention, certain steps can be performed in a different order, in parallel with one another, certain steps can be omitted entirely, and/or certain additional steps can be performed.

In step 1401, the computer 125 determines the speed of the sample 105. The computer 125 can determine the speed of the sample 105, for example, by interacting with an external sensor 155 associated with the conveyor 145. In step 1405, the computer 125 instructs the camera 115 to capture a sequence of images of the sample 105. The computer 125 can instruct the camera 115 to capture the sequence of images, e.g., upon receiving a signal from an external signal or upon the occurrence of another designated event. In one embodiment of the invention, the camera 115 can automatically instruct the camera 115 to capture the sequence of images at pre-determined times or intervals.

In step 1410, the camera 115 captures the sequence of images at a constant time interval. In accordance with the electronic shutter of the camera 115, the constant time interval can be, for example, 42 milliseconds. During the sequence of image captures, the conveyor 145 continuously, horizontally translates the sample 105 beneath the grating 120. Due to the angled disposition of the grating 120, the relative distance between the sample 105 and the grating 120 continuously changes with the horizontal translation of the sample 105. The continuous change in relative distance between the sample 105 and the grating 120 introduces a phase step between the shadow moiré fringe patterns of each successive captured image. That phase step can either be known or unknown to the computer 125.

In step 1415, the computer 125 calculates the lateral offset of the sample 105, in pixels, between each successive image acquisition. For example, the computer 125 can calculate the lateral offset using the following equation: LO=INT $(V*T_x*R)$, where LO is the lateral offset, V is the speed of the sample 105, $T_x$ is the constant time interval between each image, R is the lateral resolution of the camera 115, and INT rounds the product of V, $T_x$, and R to the nearest integer value.

In step 1420, the computer 125 selects pixel locations (x,y) in the sample 105. The pixel locations can be selected, e.g., based on the known location of the sample 105 during the first image capture—the first imaging location. For example, the computer 125 can select a set of pixel locations in the sample 105 of the first captured image and then determine the corresponding set of pixel locations in the sample 105 in each of the subsequently captured images using the lateral offset.

In step 1423, the computer 125 determines, in each captured image, the intensity value of each pixel at each selected pixel location. In an alternative embodiment of the invention, the computer 125 can determine the intensity value of each pixel, in each captured image, upon image capture or at another suitable time. In step 1425, the computer 125 calculates the phase value of each pixel at each selected pixel location by substituting the determined intensity values and lateral offset into one or more phase calculation algorithms. The form of the phase calculation algorithm(s) can vary depending on whether the computer 125 knows the phase step.

For example, if the camera 115 captured a sequence of four images with a known phase step of 90°, the computer 125 can substitute the intensity values and lateral offset into the standard phase calculation algorithm. Alternatively, if the camera 115 captured a sequence of four images with an unknown phase step, the computer 125 can substitute the intensity values and lateral offset into the Carré algorithm.

In step 1430, the computer 125 calculates the relative height of the sample surface at each selected pixel location from the phase values. For example, the computer 125 can substitute each phase value into the following algorithm:

$$Z(x,y)=W*(N+\phi(x,y)/2\pi),$$

where Z (x,y) is the relative height of the sample surface at pixel location (x,y), W is the fringe value, N is the fringe order, and $\phi$ (x,y) is the phase of the pixel at location (x,y). The fringe order is an arbitrary integer number assigned to a particular fringe to indicate its order in the series of fringes in the image. For example, a series of four fringes can be assigned fringe orders of 0, 1, 2, and 3. Alternatively, the series of fringes can be assigned fringe orders of 2, 3, 4, and 5. Other suitable algorithms for determining the relative height of the sample surface at a pixel location based on a phase value will be readily apparent to a person of skill in the art. The relative height value of a particular pixel indicates the height of the sample surface at the pixel relative to the height at all other points on the sample surface.

In step 1435, the computer 125 calculates one or more warpage gauges from the set of Z (x,y) values obtained in step 950. For example, the warpage gauge can be the coplanarity (COP) gauge calculated by: COP=MAX (Z (x,y))−MIN (Z (x,y)), where MAX (Z (x,y)) determines the maximum of the Z (x,y) values and MIN (Z (x,y)) determines the minimum of the Z (x,y) values. Other suitable warpage gauges, such as the "Bow" gauge and the "Twist" gauge, are well known in the art.

In conclusion, the foregoing exemplary embodiments enable an efficient and cost-effective approach to measuring surface flatness of continuously moving samples. It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention as defined by the following claims. It should also be understood that the invention is not restricted to the illustrated embodiments and that various modifications can be made within the scope of the following claims.

What is claimed is:

1. A method for measuring surface flatness of a continuously moving sample comprising the steps of:

conveying the sample on a conveyor surface that extends beneath a grating disposed at a non-zero angle with respect to the plane of conveyance;

capturing a time sequence of images of the sample at different locations beneath the grating using a camera, each image comprising a shadow moiré fringe pattern that is indicative of the surface flatness of the sample;

calculating a lateral offset of the sample, in pixels, between each image acquisition;

in a first of the images, selecting a set of pixel locations in the sample and determining the intensity value at each of the pixel locations;

in each of the other images, selecting the set of pixel locations based on the lateral offset and determining the intensity value at each of the pixel locations;

calculating a phase value for each selected pixel location based on the intensity values; and calculating a relative height of the sample surface at each pixel location based on the phase values.

2. The method of claim 1, wherein the images are captured at constant time intervals.

3. The method of claim 2, wherein the lateral offset equals INT ($V*T_x*R$), wherein V is the speed of the sample, $T_x$ is the constant time interval between each image, R is the lateral resolution of the camera, and INT rounds the product of V, $T_x$, and R to the nearest integer value.

4. The method of claim 1, wherein a phase step is introduced between the shadow moiré fringe pattern of each successive image in the time sequence of images.

5. The method of claim 4, wherein the phase step is known.

6. The method of claim 4, wherein the phase step is unknown.

7. The method of claim 1, wherein the step of calculating the phase value for each selected pixel location comprises applying the Carré algorithm based on the intensity values.

8. The method of claim 1, wherein the step of capturing a time sequence of images comprises capturing a time sequence of four images.

9. The method of claim 1, further comprising the step of calculating a warpage gauge based on the relative height of the sample at each pixel location.

10. The method of claim 1, further comprising the step of determining the speed of the sample by reading the speed of the sample from a signal of a sensor associated with the conveyor surface.

11. The method of claim 1, wherein the sample comprises a discrete object.

12. The method of claim 11, further comprising the step of determining the speed of the sample by:

registering a leading edge of the sample at a first sensor at a first time;

registering a leading edge of the sample at a second sensor at a second time;

determining the time difference between the first time and the second time;

determining the distance between the first sensor and the second sensor; and dividing the distance by the time difference.

13. The method of claim 11, further comprising the steps of:

determining the distance between a first sensor and an imaging location, the imaging location being disposed beneath the grating and in a field of view of a camera;

registering a leading edge of the sample at the first sensor at a first time;

determining the speed of the sample;

calculating a delay time by dividing the distance between the first sensor and the imaging location by the speed of the sample, the delay time substantially equaling the time required for the sample to travel from the first sensor to the imaging location; and signaling the camera to capture the time sequence of images after a second time, the second time equaling the first time plus the delay time.

14. The method of claim 13, wherein the step of determining the speed of the sample comprises the steps of:

registering a leading edge of the sample at a second sensor at a third time;

determining the time difference between the first time and the third time;

determining the distance between the first sensor and the second sensor; and dividing the distance between the first sensor and the second sensor by the time difference between the first time and the third time.

15. The method of claim 1, wherein the sample comprises one of a region of a band of material and a region of a band of web.

16. The method of claim 15, further comprising signaling the camera to capture the first image of the time sequence of images at a pre-determined time.

17. A method for measuring surface flatness of a continuously moving sample comprising the steps of:

conveying the sample on a conveyor surface that extends beneath a grating disposed at a non-zero angle with respect to the plane of conveyance, the sample comprising a discrete object;

capturing a time sequence of images of the sample at different locations beneath the grating using a camera, each image comprising a shadow moiré fringe pattern that is indicative of the surface flatness of the sample;

in each of the images, determining the intensity value of each pixel;

calculating a lateral offset of the sample, in pixels, between each image acquisition;

for each pixel, calculating a brightness value based on the intensity value of the pixel in each image and the lateral offset;

assembling a brightness image from the brightness values;

applying an optical part location algorithm to locate the sample within the brightness image;

responsive to the results of the optical part location algorithm, in a first image of the sequence of the images, selecting a set of pixel locations in the sample;

in each of the other images of the sequence of images, selecting the set of pixel locations based on the lateral offset;

calculating a phase value for each selected pixel location based on the intensity values; and calculating a relative height of the sample surface at each pixel location based on the phase values.

18. The method of claim 17, wherein the images are captured at constant time intervals.

19. The method of claim 18, wherein the lateral offset equals INT ($V*T_x*R$), wherein V is the speed of the sample, $T_x$ is the constant time interval between each image, R is the lateral resolution of the camera, and INT rounds the product of V, $T_x$, and R to the nearest integer value.

20. The method of claim 17, wherein a phase step is introduced between the shadow moiré fringe pattern of each successive image in the time sequence of images.

21. The method of claim 20, wherein the phase step is known.

22. The method of claim 20, wherein the phase step is unknown.

23. The method of claim 17, wherein the step of calculating the phase value for each selected pixel location comprises applying the Carré algorithm based on the intensity values.

24. The method of claim 17, wherein the step of capturing a time sequence of images comprises capturing a time sequence of four images.

25. The method of claim 17, further comprising the step of calculating a warpage gauge based on the relative height of the sample at each pixel location.

26. The method of claim 17, further comprising the step of determining the speed of the sample by reading the speed of the sample from a signal of a sensor associated with the conveyor surface.

27. The method of claim 17, further comprising the step of determining the speed of the sample by:
 registering a leading edge of the sample at a first sensor at a first time;
 registering a leading edge of the sample at a second sensor at a second time;
 determining the time difference between the first time and the second time;
 determining the distance between the first sensor and the second sensor; and
 dividing the distance by the time difference.

28. The method of claim 17, further comprising the steps of:
 determining the distance between a first sensor and an imaging location, the imaging location being disposed beneath the grating and in a field of view of a camera;
 registering a leading edge of the sample at the first sensor at a first time;
 determining the speed of the sample;
 calculating a delay time by dividing the distance between the first sensor and the imaging location by the speed of the sample, the delay time equaling the time required for the sample to travel from the first sensor to the imaging location; and
 signaling the camera to capture the sequence of images after a second time, the second time equaling the first time plus the delay time.

29. The method of claim 28, wherein the step of determining the speed of the sample comprises the steps of:
 registering a leading edge of the sample at a second sensor at a third time;
 determining the time difference between the first time and the third time;
 determining the distance between the first sensor and the second sensor; and
 dividing the distance between the first sensor and the second sensor by the time difference between the first time and the third time.

30. A system for measuring surface flatness of a continuously moving sample comprising:
 a conveyor continuously conveying a sample along a plane of conveyance;
 a grating disposed above the sample at a non-zero angle with respect to the plane of conveyance;
 a light source configured to illuminate the grating and the sample;
 a camera disposed above the grating and the sample and configured to capture at least one image comprising a shadow moiré fringe pattern that is indicative of the surface flatness of the sample; and
 a computer associated with the camera and configured to process the image to measure the surface flatness of the sample.

31. The system of claim 30, wherein the light source is a pulsed light source of the line source type and is configured to emit at least one pulse of light during each image capture.

32. The system of claim 30, wherein the light source is a continuous light source of the line source type, the line of the light source being disposed parallel to lines of the grating.

33. The system of claim 30, wherein the camera comprises an electronic shutter.

34. The system of claim 30, further comprising a sensor operable to detect the sample and to transmit at least one signal to the computer upon detecting the sample, wherein the computer is further configured to process the signal.

35. The system of claim 30, further comprising a sensor operable to determine the speed of conveyance of the sample and to transmit at least one signal comprising the speed to the computer, wherein the computer is further configured to process the signal.

* * * * *